US011687885B2

(12) United States Patent
Clark et al.

(10) Patent No.: US 11,687,885 B2
(45) Date of Patent: Jun. 27, 2023

(54) TRANSACTION SIGNING UTILIZING ASYMMETRIC CRYPTOGRAPHY

(71) Applicant: Visa International Service Association, San Francisco, CA (US)

(72) Inventors: Adam Clark, Manassas, VA (US); Kim Wagner, Sunnyvale, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 930 days.

(21) Appl. No.: 15/054,993

(22) Filed: Feb. 26, 2016

(65) Prior Publication Data

US 2016/0253663 A1 Sep. 1, 2016

Related U.S. Application Data

(60) Provisional application No. 62/126,297, filed on Feb. 27, 2015.

(51) Int. Cl.
*G06Q 20/02* (2012.01)
*G06Q 20/36* (2012.01)
(Continued)

(52) U.S. Cl.
CPC ......... *G06Q 20/02* (2013.01); *G06Q 20/0655* (2013.01); *G06Q 20/28* (2013.01);
(Continued)

(58) Field of Classification Search
CPC ........ G06Q 20/02; G06Q 20/10; G06Q 20/12; G06Q 20/065; G06Q 20/06;
(Continued)

(56) References Cited

U.S. PATENT DOCUMENTS 6,072,876 A * 6/2000 Obata ..................... H04L 9/302
380/282
9,875,510 B1 * 1/2018 Kasper .................. G06Q 40/12
(Continued)

FOREIGN PATENT DOCUMENTS

WO 2014-196969 A1 12/2014
WO WO 2015/142765 A1 3/2015

OTHER PUBLICATIONS

Mark Friedenbach, Freimarkets: extending bitcoin protocol with user-specified bearer instruments, peer-to-peer exchange, off-chain accounting, auctions, derivatives and transitive transactions, Aug. 24, 2013 (Year: 2013).*

(Continued)

*Primary Examiner* — Neha Patel
*Assistant Examiner* — Chunling Ding
(74) *Attorney, Agent, or Firm* — Kilpatrick Townsend & Stockton LLP (57) ABSTRACT

Embodiments relate to systems, apparatuses, and methods for performing transaction signing utilizing asymmetric cryptography and a private ledger. A transaction data is signed by a user device using a private key, and may be utilized in an authorization request message without including a real credential of the user. A transaction verification and accounting module (TVAM) can verify the signed transaction data and can continue processing the transaction.

15 Claims, 4 Drawing Sheets

(51) Int. Cl.
*G06Q 20/34* (2012.01)
*G06Q 20/38* (2012.01)
*G06Q 20/28* (2012.01)
*G06Q 20/06* (2012.01)
*G06Q 20/32* (2012.01)
*H04L 9/32* (2006.01)
*H04L 9/00* (2022.01)

(52) U.S. Cl.
CPC ....... *G06Q 20/3274* (2013.01); *G06Q 20/341* (2013.01); *G06Q 20/3678* (2013.01); *G06Q 20/3825* (2013.01); *G06Q 20/38215* (2013.01); *H04L 9/3236* (2013.01); *G06Q 2220/00* (2013.01); *H04L 9/50* (2022.05); *H04L 2209/56* (2013.01)

(58) Field of Classification Search
CPC ............. G06Q 20/3678; G06Q 20/382; G06Q 20/223; G06Q 2220/00; G06Q 20/401; G06Q 20/36; G06Q 20/20; G06Q 20/32; G06Q 20/38215; G06Q 20/322; G06Q 40/04; G06Q 10/10; G06Q 20/0655; G06Q 20/0658; G06Q 20/341; G06Q 20/28; G06Q 20/3274; G06Q 20/3825; H04L 2209/56; H04L 9/3247; H04L 9/30; H04L 9/3236; H04L 2209/38; H04L 9/50
See application file for complete search history.

(56) References Cited

U.S. PATENT DOCUMENTS

| | | | |
|---|---|---|---|
| 10,909,509 B1 * | 2/2021 | Kurani | G06Q 20/02 |
| 11,361,286 B1 * | 6/2022 | Gaeta | G06Q 20/0425 |
| 2003/0014372 A1 | 1/2003 | Wheeler et al. | |
| 2003/0033534 A1 * | 2/2003 | Rand | G07F 7/1025 713/185 |
| 2003/0115151 A1 * | 6/2003 | Wheeler | G06Q 20/00 705/64 |
| 2003/0140007 A1 * | 7/2003 | Kramer | G06Q 20/04 705/40 |
| 2005/0184145 A1 † | 8/2005 | Law et al. | |
| 2006/0106693 A1 * | 5/2006 | Carlson | G06Q 20/227 705/35 |
| 2008/0222049 A1 * | 9/2008 | Loomis | G07F 7/1008 705/75 |
| 2010/0065629 A1 | 3/2010 | Wentker et al. | |
| 2010/0088517 A1 * | 4/2010 | Piersol | H04L 9/32 713/168 |
| 2013/0007849 A1 | 1/2013 | Coulter et al. | |
| 2013/0031008 A1 * | 1/2013 | Wilson | H04L 9/3247 705/76 |
| 2013/0046972 A1 * | 2/2013 | Campagna | H04L 9/0841 713/156 |
| 2015/0006392 A1 | 1/2015 | Brand et al. | |
| 2015/0046707 A1 | 2/2015 | Atherton | |
| 2015/0066768 A1 * | 3/2015 | Williamson | G06Q 20/4097 705/44 |
| 2015/0262139 A1 | 9/2015 | Shtylman | |
| 2015/0262140 A1 | 9/2015 | Armstrong | |
| 2015/0262171 A1 | 9/2015 | Langschaedel et al. | |
| 2015/0262172 A1 | 9/2015 | Rebernik | |
| 2015/0262176 A1 | 9/2015 | Langschaedel et al. | |
| 2015/0324764 A1 | 11/2015 | Van Rooyen et al. | |
| 2015/0332283 A1 * | 11/2015 | Witchey | G16H 10/60 705/3 |
| 2015/0365283 A1 * | 12/2015 | Ronca | H04L 67/12 705/71 |
| 2015/0371214 A1 * | 12/2015 | Schroder | G06Q 20/3229 705/44 |
| 2015/0371224 A1 | 12/2015 | Lingappa | |
| 2016/0044380 A1 * | 2/2016 | Barrett | H04N 21/812 725/53 |
| 2016/0050213 A1 * | 2/2016 | Storr | G06F 21/32 726/6 |
| 2016/0086175 A1 * | 3/2016 | Finlow-Bates | G06Q 20/4015 705/77 |
| 2016/0217461 A1 * | 7/2016 | Gaddam | G06Q 20/383 |
| 2016/0224977 A1 * | 8/2016 | Sabba | G06Q 20/385 |

OTHER PUBLICATIONS

Andreas Antonopoulos, Mastering Bitcoin, Dec. 2014, O'Reilly (Year: 2014).*
Mark Friedenbach, Freimarkets: extending bitcoin protocol with user-specified bearer instruments, peer-to-peer exchange, off-chain accounting, auctions, derivatives and transitive transactions, Aug. 2013 (Year: 2013).*
Qin Wang, Anonymous Blockchain-based System for Consortium, Mar. 2010 (Year: 2010).*
International Search Report and Written Opinion dated Dec. 9, 2016 in PCT Application No. PCT/US2016/019850, 12 pages.
Blockchain: Blueprint for a New Economy, Feb. 8, 2015, O'Reilly Media, Inc., XP055279098, 142 pages.
Supplementary European Search Report, dated Oct. 2, 2018, in EP Application No. 16786871.0, 8 pages.
AU2016255340 , "Second Examination Report", dated Dec. 16, 2019, 4 pages.
Application No. EP16786871.0 , Office Action, dated Dec. 17, 2020, 9 pages.
EP16786871.0 , "Summons to Attend Oral Proceedings", Apr. 14, 2022, 13 pages.
Friedenbach et al., "Freimarkets: Extending Bitcoin Protocol with User-Specified Bearer Instruments, Peer-to-Peer Exchange, Off-chain Accounting, Auctions, Derivatives and Transitive Transactions", Available online at: http://freico.in/docs/frei markets., Aug. 24, 2013.

* cited by examiner
† cited by third party

TRANSACTION SIGNING UTILIZING ASYMMETRIC CRYPTOGRAPHY

CROSS-REFERENCE TO RELATED APPLICATIONS

This application is a non-provisional of and claims the benefit of U.S. Provisional Application No. 62/126,297, filed on Feb. 27, 2015, which is herein incorporated by reference in its entirety for all purposes.

FIELD

Aspects of the disclosure relate to computing technologies and secure transaction systems. In particular, aspects of the disclosure relate to systems, methods, apparatuses, and computer-readable media for utilizing transaction signing via asymmetric cryptography and a private ledger.

BACKGROUND

As the world has moved into the digital realm, financial transactions have shifted away from paper-based schemes (e.g., the exchange of physical or paper currency) to instead rely upon electronic systems for monetary exchange. Bitcoin is one type of electronic peer-to-peer payment system that is commonly referred to as a cryptocurrency or digital currency. Although there are many such crypto-currencies, Bitcoin is one of the most well-known. Payments made using the Bitcoin system are recorded in a public ledger (the "blockchain") using its own unique unit of account, which is also deemed a "Bitcoin." The blockchain is stored throughout the network on each user's device. The Bitcoin system has no central repository and no single administrator, and is viewed as a decentralized virtual currency.

Bitcoin is referred to as a libertarian currency due to its de-centralized, anonymity-preserving nature. For example, compared to existing types of available currency, Bitcoins appear to have an increased level of anonymity. Thus, in a conventional transaction, a person who has deposited an amount of an available currency (e.g., dollars) at a bank may be required to provide their identification to withdraw their deposited funds and/or transfer their deposited funds to another person. In contrast, the ownership of Bitcoins can be anonymous and does not require any identification (other than a randomly generated key address).

New Bitcoins are created as a reward for payment processing work performed by computing devices involved in the system. For example, users may use their computing power—or even rent the computing power of others—to verify and record payments into the public ledger. This process is referred to as "mining."

Bitcoin-like currencies have a number of advantages, but they also present some drawbacks. Although the increased anonymity in Bitcoin can be viewed as a benefit, this anonymity also presents a dark side, as it can allow for money laundering, fraud, and other illegal activities. Further, it takes a significant amount of time and computing power before a transaction is officially recorded in the public blockchain. Also, if a user's computer crashes or otherwise malfunctions and the user is unable to retrieve his private key, then the user will essentially lose all of her Bitcoins.

Thus, despite some benefits provided by Bitcoin-like crypto-currencies, there remains a need for other payment systems that do not suffer from some of the negative features of Bitcoin-like crypto-currencies. Embodiments of the invention address these and other problems, individually and collectively.

DETAILED DESCRIPTION

The following disclosure provides exemplary systems, apparatuses, and methods for conducting financial and other transactions. Although reference may be made to such financial transactions in the examples provided below, embodiments are not so limited. That is, the systems, apparatuses, and methods described herein may be utilized for any suitable purpose. For example, embodiments of the invention may be used to keep track of other types of transactions including transactions in which a user wants to access a building, venue or location, or wants to access data. In embodiments of the invention, transactions may be conducted online or at a point of transaction (e.g., in person at a point of sale).

Embodiments of the invention introduce a system that provides some benefits of traditional fiat currencies—such as well-known and easy to use payment procedures—together with some benefits of digital currencies (e.g., increased data security), while reducing the downsides of these digital currencies.

According to some embodiments, a centralized Transaction Verification and Accounting Module (TVAM) in a Transaction Verification Account Module System can manage funds for prepaid accounts in a ledger. Unlike the distributed and publicly available Bitcoin blockchain, the ledger that is used in embodiments of the invention can be privately managed (i.e., it is not a public ledger). The ledger may optionally be used with conventional payment accounts with available funds or credit. In some embodiments, the accounts are for prepaid payment cards. In other embodiments, the accounts may be other types of accounts including, but not limited to savings accounts, checking accounts, credit accounts, debit accounts, online accounts, access accounts, etc. In such embodiments, the details of records in the ledger can be provided to issuers associated with the particular accounts, but not be made generally available to the public.

In some embodiments, each account maintained in the ledger includes a record or identifier of one or more public keys associated with the account. An account owner (e.g., consumer) can control the corresponding private key(s) (e.g., elliptic curve or RSA private keys), which can be used to conduct transactions.

In some embodiments, an account owner (or user) may store a public/private key pair on a user device. The public/private key pair may have been previously loaded on the user device by an entity associated with the TVAM or may have been generated with software on the user device. The user device may be a payment device such as an chip card (e.g., an EMV or Europay Mastercard Visa chip card), mobile phone, etc.

In a specific embodiment, the payment device can be a chip card (e.g., a credit or debit card with a computer chip in it). The user such as the account holder can utilize the chip card to conduct a transaction. In the transaction, the chip card can receive transaction data and combine it with other transaction data, and then sign the combined transaction data, thereby cryptographically tying the transaction to the particular chip card. Unlike Bitcoin, the account holder has proven her identity to a financial institution when (i.e., in advance of or while) getting the chip card, and this can enable replacement cards to be issued (and thus, restore access to associated funds) if and when the user loses her card. In this case, the TVAM can create a new entry for a new public key, and move the funds from the customer's old public key to the new public key, and issue the account holder a chip card with a private key corresponding to the new public key. Alternatively, the TVAM can simply replace the "old" public key for the account record in the ledger without needing to create a new, separate entry.

Additionally, some embodiments provide speed and ease for consumers making payments, such as by utilizing QR scanning via a cellphone camera. Additionally, as will be illustrated in the examples below, sensitive information such as the PAN (primary account number) of an account need not be disclosed to a merchant or used in payment authorization messages, which provides increased security.

Embodiments of the invention can also utilize accounts that are tied to a prepaid account, which can provide access to payment services for users that do not have (or want to use) a bank account. Further, in some embodiments if a user is issued a chip card and loses the card, the user is able to get her money back.

Embodiments of the invention eliminate the negative aspects of anonymity while preserving beneficial aspects anonymity. For example, a consumer and merchant (or recipient) may transact without ever needing to know the identity or bank credentials of the other transacting party, while at the same time, the TVAM can provide insight into the involved parties to protect against possible fraudulent uses, money laundering, or transactions involving unlawful entities.

Before discussing the Figures, some descriptions of some terms may be helpful.

An "issuer" may include to a business entity (e.g., a bank or other financial institution) that maintains one or more accounts (e.g., financial accounts) for a user. Examples of issuers include banks, transit agencies, governmental entities, etc.

An "acquirer" may include an entity that has a business relationship and/or maintains one or more accounts associated with a particular merchant or an entity that wishes to transact with the user.

An "access device" may be any suitable device that can interact with a user device (e.g., a payment card or mobile phone). An access device may communicate with or may be at least a part of a merchant computer. Access devices may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, and security systems, remote computers operating Websites, and the like. In some embodiments, an access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device.

An "authorization request message" may be an electronic message that requests authorization for a transaction. In some embodiments, an authorization request message is sent to a payment processing network and/or an issuer of a payment card to request authorization for a transaction. An authorization request message may comply with ISO 8583, which is a standard for systems that exchange electronic transaction information associated with a payment made by a consumer using a payment device or payment account. An authorization request message may also comprise "transaction information," such as any information associated with a current transaction, such as the transaction amount, merchant identifier, merchant location, etc.

In some embodiments, an authorization request message does not include an issuer account identifier or Primary Account Number (PAN) associated with a payment account the payer, but instead may include a public key of the payer. In some cases, the public key of the payer can be used to identify an entry associated with a payment account of the payer. In such embodiments, the disclosed TVAM may receive an authorization request message not including an issuer account identifier or PAN of the payer. In some embodiments, the TVAM may update a ledger using the received information in the authorization request message, and may reply back with an authorization response message. In other embodiments, the TVAM may use data from the authorization request message to identify an account identifier or PAN, and may generate and transmit a new authorization request message including the identified issuer account identifier or PAN to an issuer of the payment account. The issuer may then respond back to the TVAM with an authorization response message and the authorization response message may be transmitted to the payer and/or the payee.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant. In other embodiments, an authorization response message may simply be a confirmation that a transaction has been conducted.

In some embodiments, as described herein, an authorization response message may not include an issuer account identifier or Primary Account Number associated with the payer, but instead may include a public key of the recipient or payer, which can be utilized to identify an entry associated with a payment account of the payer.

A "payment account" (which may be associated with one or more payment devices) may refer to any suitable payment account including a credit card account, a checking account, or a prepaid account.

A "user device" may be any suitable device that is operated by a user. Suitable user devices can be portable, and can communicate with external entities such as access devices. Examples of user devices include cards that data stored on them, mobile phones, laptop computers, transponders, wearable devices such as smart watches, automobiles with remote communication capabilities, access cards, smart media, etc. A payment device may be an example of a user device.

A "payment device" may refer to a device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. If the payment device is in the form of a debit, credit, or smartcard, the payment device may also optionally have features such as magnetic stripes. Such devices can operate in either a contact or contactless mode.

"Transaction data" may include any suitable information surrounding a transaction. Examples of transaction data may include a time and/or data of the transaction, the parties involved in the transaction, the amount of the transaction, the terms of the transaction, the goods, services or rights being transacted, etc.

"Payment transaction data" may refer to any information corresponding to or describing purchases, orders, invoices, payments involving goods, items, services, and/or the like, and may include, but is not limited to, purchase amounts (or "transaction amounts"), merchant identifiers, description codes (e.g., NAICS: North American Industry Classification System) associated with purchased items, costs of purchased items, descriptions of purchased items, purchase dates, indications of payments accounts used, indications as to the mode of purchase (e.g., QR code, online, in person, contactless, etc.), confirmation numbers, order numbers, cancellation numbers, shipment status updates (e.g., order being processed, shipped, delivered, on back order, etc.), delivery tracking numbers, cancellation notices, updates, transaction party identifiers, payment device identifiers, encryption keys, and/or the like.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. A server computer may also be in the form of a collection of computers in the cloud that services the requests of one or more client computers.

A "processor" may include a a central processing unit (CPU). A processor can include a single-core processor, a plurality of single-core processors, a multi-core processor, a plurality of multi-core processors, or any other suitable combination of hardware configured to perform arithmetical, logical, and/or input/output operations of a computing device.

Figure 1:
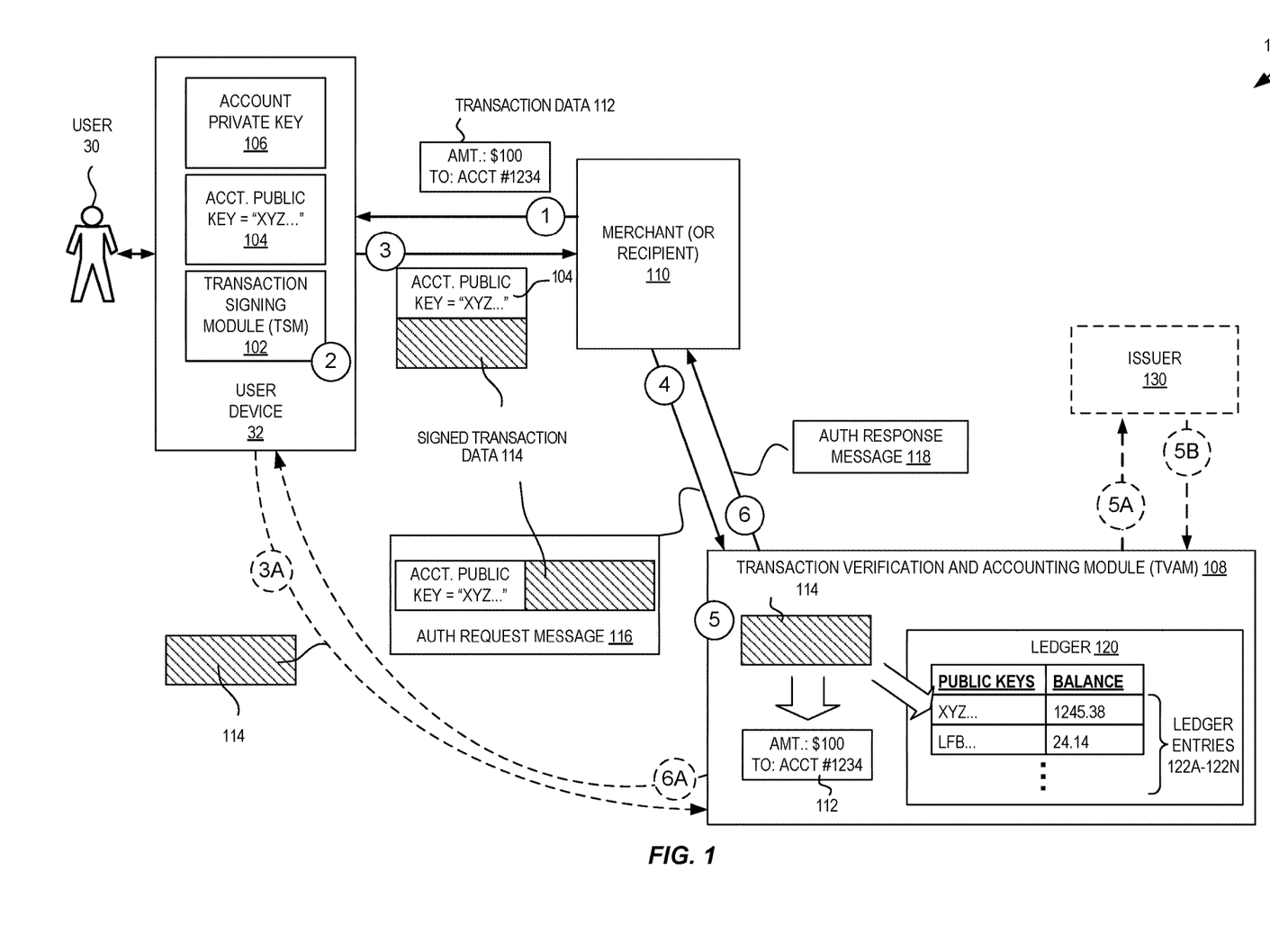
FIG. 1 shows a block diagram of a system according to an embodiment of the invention. A process flow is also illustrated in FIG. 1.

FIG. 1 shows a diagram of an exemplary transaction system 100 configured for transaction signing utilizing asymmetric cryptography and a private ledger according to some embodiments. FIG. 1 illustrates a user 30, a user device 32, a merchant (or recipient) 110, and a Transaction Verification and Accounting Module (TVAM) 108. An optional issuer 130 may be in communication with the TVAM 108. If the user device 32 is a chip card, then a card reader can be used to interface with the card. The reader can be owned and operated by the merchant, or for home shopping it could be coupled with a consumer's personal or laptop computer.

Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

In FIG. 1, the merchant 110 communicates transaction data 112 to the user 30 (e.g., the user device 32) at circle '1', which can include the transaction amount (e.g., $100), a public key associated with the merchant that is to receive the payment (or simply an account identifier of a merchant account), and possibly other data such a date, time, a merchant name or address or identifier, a description of involved goods, a transaction number, etc. The transaction data 112 can be communicated by a QR code, Bluetooth (both classic and low energy Bluetooth), card reader, SMS, part of a website or application, or other ways known to those of skill in the art.

The user device 32 can be configured to use a digital signature for performing payment transactions, which is based upon the use of an encryption certificate. The encryption certificate can comprise a public key 104 and a private key 106 in a public/private key pair. In some cases, the public key 104 may characterized as a "certified public key." In some embodiments, the private key 106 is used to generate a digital signature (i.e., data encrypted using the private key 106) and the public key 104 can be made publicly available (e.g., to other entities in the payment network) to allow others to verify the authenticity of the signed data. A digital certificate containing the public key may also reside on the user device 32.

Thus, at circle '2', the transaction signing module (TSM) 102 may be stored on a computer readable medium of the user device 32 (e.g., a chip card) and can (with a data processor (not shown in FIG. 1)) sign the transaction data (e.g., at least the user's public key, the merchant's public key, and the transaction amount) in the user device 32 using its private key 106. For example, the TSM 102, working with a data processor, can encrypt some or all of the transaction data 112 using the private key 106 as an input to a particular encryption algorithm to yield signed transaction data 114. If, for example, the user device 32 is a mobile phone, this signing can be done on the phone itself. In other embodiments of the invention, the transaction data may be processed through a hash function and the hash output may be signed by the private key 106.

In some embodiments, the same public/private key pair (for a same account) can be used by multiple payment devices, and in some embodiments multiple public/private key pairs can be associated with a same account and deployed to different devices. Additionally, although not illustrated herein, more complicated transactions can be performed involving multiple recipients (e.g., multiple public keys as recipients, multiple merchant or recipient account identifiers, etc.) with the transaction data specifying how much each account (e.g., public key or account identifier) is to receive.

At this point, there are many possible ways that the signed transaction data can be provided to the TVAM 108. Some examples are provided below.

In some embodiments, the signed transaction data is provided through (or by) the merchant 110. For example, at circle '3', the user device 32 provides the signed transaction data 114 (and the associated account public key 104 or some other account or user identifier) to the merchant 110, using the same (or different) communications channel from the communications channel from which the transaction data 112 was received (at circle '1'). This data may be used, by the merchant 110, to construct an authorization request message 116 (e.g., an ISO 8583 message). For example, the signed transaction data 114 and/or public key 104 (or a public key certificate) can be placed in a field of an authorization request message 116, and sent using traditional payment processing protocols at circle '4' to the TVAM 108. The TVAM 108 could be implemented within a payment processing network computer, an acquirer computer, or an issuer computer. If the TVAM 108 is present in a payment processing network, then the authorization request message may pass through an acquirer before reaching the payment processing network.

In some embodiments, the authorization request message 116 may include a fake PAN (i.e., not a legitimate PAN that can be used to conduct a payment transaction) selected to identify that the authorization request involves a signed transaction as detailed herein, and that it should be processed by the TVAM 108. In other embodiments, the public key 104 may reside in a supplemental data field such as field 55. In addition to including the signed transaction data 114 and the public key 104, the authorization request message may also include a transaction amount and a merchant identifier such as the merchant's public key. The amount, merchant's public key, the user's public key 104 and the signed transaction data 114 may be encrypted or may be in the clear in the authorization request message.

In some embodiments, the signed transaction data 114 as well as the other data in the authorization request message can be sent by the user device 32 to the TVAM 108 without going through the merchant 110, as illustrated by circle '3A'. In yet other embodiments, some data in the authorization request message could be sent to the TVAM 108 through paths including circles '3' and/or '4', while other data in the previously described authorization request message could be sent through path including circle '3A'. For example, the transaction amount and the merchant identifier could be sent directly from the merchant 110 to the TVAM 108 in path including circle '4'. The public key 104 and the signed transaction data 114 could be sent to the TVAM 108 in the path including circle '3A'. A transaction ID or some other linking data may be created by and/or exchanged between the user device and the merchant 110 in order for the TVAM 108 to know that the two received messages that are coming from different communication paths are related to the same transaction.

If some or all of the data in an authorization request message is received through a path including circle '3A', an authorization response message may be sent from the TVAM 108 to the user device 32 at circle '6A'. In some embodiments, the user device 32 can be configured to provide some or all of the data in an authorization response message back to the merchant 110 (e.g., to a merchant point of sale device, using, e.g., Bluetooth, QR code, or some other signal), which can make it easier for the merchant 110 to link the purchase with the authorization.

Upon receipt of the signed transaction data 114—regardless of how the data arrived there—at circle '5' the TVAM 108 can be configured to verify the signed transaction data. In some embodiments where the signed transaction data is carried in an authorization request message 116, the TVAM 108 can identify that the transaction carries signed transaction data and should be further processed (e.g., using the ledger 120). For example, in some embodiments, a particular fake PAN provided in the payment authorization request message 116 may signal that the authorization request message contains signed transaction data and a user public key 104 elsewhere in the authorization message, and that the authorization request message is to be processed accordingly.

The TVAM 108 receives (e.g., as part of the received authorization request message 116) a public key 104 associated with the private key 106 used to sign the transaction data, which was provided by the user device 32 (at circle '3' or '3A'). The TVAM 108 can use the public key 104 to validate the signature over the transaction data to verify that the authorization request message was part of an authentic transaction between the user and the merchant (or recipient) 110. The TVAM 108 can also use the public key 104 to look up available funds for the account that is paying the transaction (the account identified with the public key 104).

In some embodiments, the TVAM 108 uses the public key 104 to identify a ledger entry (from one or more ledger entries 122A-122N of ledger 120) associated with the involved payment account. In this simplified depiction, the ledger 120 includes a column of public keys and a column of account balances, though of course in various embodiments the ledger can include different types of data (e.g., a column of account PANs or account IDs instead of public keys, an issuer identifier, a set of policies or restrictions associated with the particular account, etc.). Additionally, in various embodiments the ledger 120 can be implemented using different types of data structures and/or hardware, including but not limited to database tables, key-value stores, hash table, associative array, ternary content-addressable memories (TCAM), etc.

Regardless of the implementation, the TVAM 108 can identify the account used to sign the transaction (e.g., looking up a provided public key). Once the TVAM 108 has received verified the authorization request message, it may then further process the transaction. Further processing can occur in different ways.

In some embodiments the TVAM 108 can identify a traditional PAN (and thus, an associated issuer of the account), and forward a modified authorization request message including the PAN (and not the public key 104) to that issuer 130 (at circle '5A') for approval. The issuer 130 may then determine whether or not the transaction is authorized (by checking for fraud and/or the available credit or funds in the account) and may generate an authorization response message comprising the PAN. The TVAM 108 may then receive the authentication response message from the issuer 130 (at circle '5B'), and may then modify the authorization response message to include the public key 104 instead of the PAN. The modified authorization response message may be returned to the merchant 110 and/or user device 32 at either circle '6' or '6A'.

The authorization request message forwarded to the issuer 130 may comprise a protocol-adherent authorization request message generated by the TVAM 108. The authorization request message may include obtaining the transaction data 114 and placing some or all of it into necessary locations in the authorization request message. Notably, this configuration prevents the user device 32 and merchant 110 from having access to the real account numbers (e.g., a PAN) of the payer and/or payee accounts (or payment tokens or pseudo-account numbers associated with real account numbers). Rather, the TVAM 108 can identify these values (using the data received at circle '4' or '3A') and place them into an authorization request message before sending it to the issuer 130. In some embodiments, the TVAM 108 thus could, but does not need to maintain balances (or adjust balances) in the ledger 120.

In other embodiments, the TVAM 108 may maintain and adjust balances in the ledger 120. In some embodiments, the TVAM 108 identifies the account in order to identify a current balance associated with the account. Thus, the TVAM 108 can process the transaction (without the involvement of the issuer 130) by determining whether the current available balance of the account (e.g., from the ledger 120) meets or exceeds the requested transaction amount from the transaction data 112. If enough available funds are available, the TVAM 108 can deduct the transaction amount from the available balance, and return an authorization response message 118 (at circle '6' to the merchant 110 or directly back to the user device 32 at circle '6A') indicating that the transaction is authorized. Conversely, if not enough of a current balance exists to satisfy the requested transaction amount, the TVAM 108 can return an authorization response message 118 (at circle '6' to the merchant 110 or directly back to the user device 32 at circle '6A') indicating that the transaction is not authorized. The authorization response message 118 can be the evidence to the merchant that the payment was approved and that it is safe to provide the goods to the user 30. The transaction may then continue accordingly, and the merchant 110 and/or user 30 may proceed with the transaction or terminate the transaction, for example, based upon the authorization result carried by the authorization response message 118.

During this processing, the TVAM 108 can be configured to transfer the withdrawn funds into another account balance of another entry in the ledger 120, such as when the signed transaction data 114 includes a public key of the merchant/recipient/payee. In some embodiments, the TVAM 108 can transmit a message to an acquirer (not shown) associated with the merchant 110 account to further cause the transfer to occur and/or to indicate that the transfer was successful. An appropriate settlement process may occur between the acquirer and the issuer at a later time.

In embodiments of the invention, the authorization response message 118 does not carry an actual account number of the payment account (e.g., a PAN), and may instead include the payer's public key. This can provide security benefits, as the payer does not need to expose their account number to the merchant (or other involved entities) at all.

In processing a transaction, the TVAM 108 can be configured or programmed to increment a transaction history account to add a transaction fee associated with the issuer(s) associated with the payer and/or recipient accounts. The transaction fee amount can be a static unchanging amount, a variable amount based upon details of the transaction itself (e.g., a transaction amount), or a combination of both.

The TVAM 108 can also be configured or programmed to expose an API that can be provided to issuers (associated with the accounts maintained in the ledger 120) to access the ledger 120 for their own account holders. If the same accounts are associated with physical cards, the issuer may desire to ensure consistency with their own records, so that an account holder with $100 available cannot pay $100 in a physical store and at the same time spend the same $100 online, for example. Thus, the TVAM 108 can be configured to "push" account updates to associated issuers and/or respond to "pull" requests for per-account or multi-account activity and/or balance information.

In yet other embodiments, the ledger 120 may be in the form of a blockchain. The blockchain may comprise a series of blocks of transactions that are created and verified by the TVAM 108. Each block in the blockchain may include a reference to the previous block (e.g., a hash output of a previous block), metadata, and a list of transactions. Each transaction may be represented by the signed transaction data (e.g., signed transaction data 114), inputs (e.g., references to all of the past transactions that leads to the user 30 having his current account balance), and outputs including the recipient's public key (or other identifier) and the amount of the current transaction). The blockchain can be updated using techniques know in the art as additional transactions are received and processed.

In embodiments of the invention, since the blockchain is not present on all computers in a distributed network, but is maintained by the TVAM 108 which is secure, computationally intensive features such as proofs of work are not present or needed in embodiments of the invention.

Figure 2:
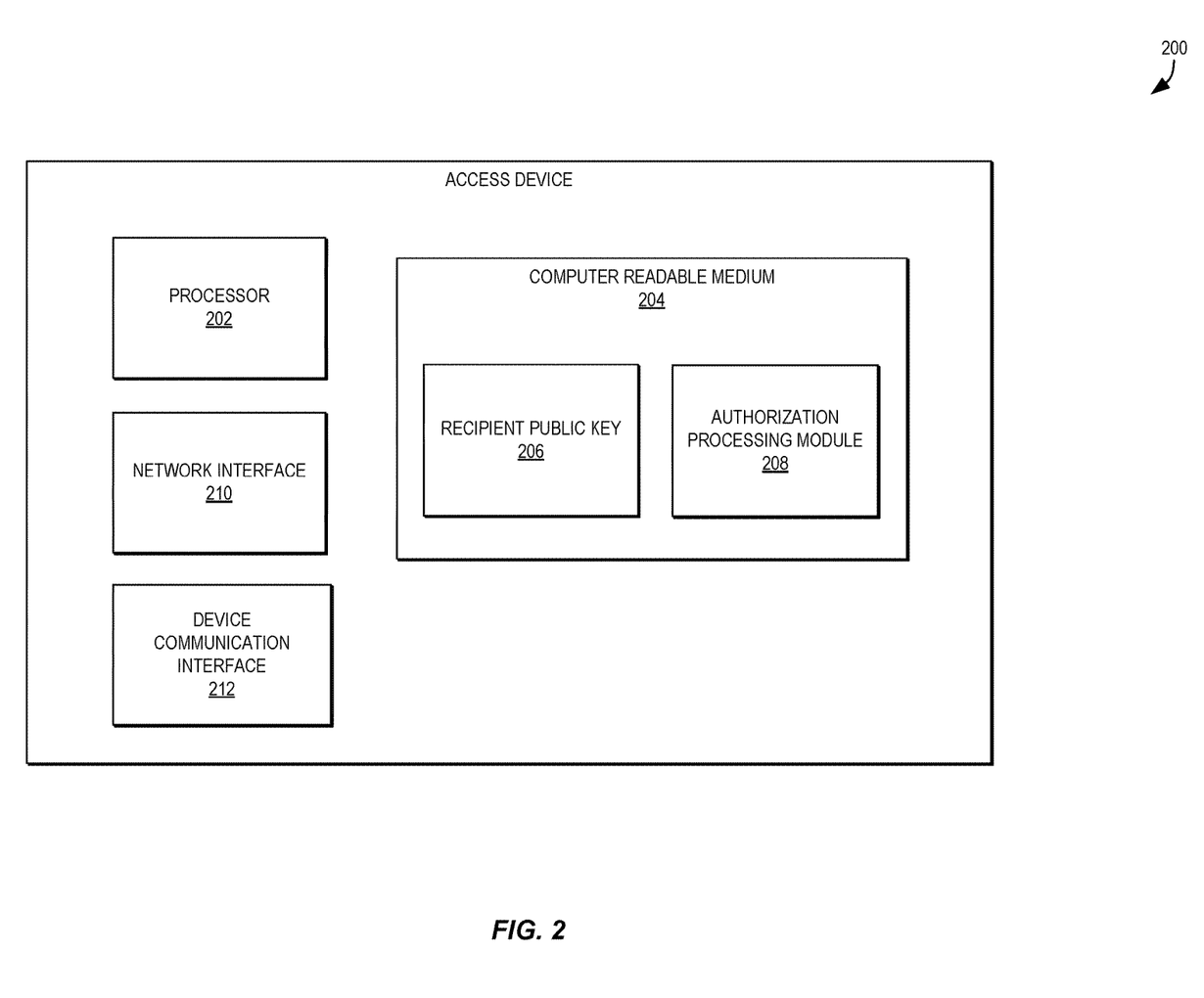
FIG. 2 illustrates a block diagram of an access device according to an embodiment of the invention.

FIG. 2 shows a diagram of an access device 200 according to an embodiment of the invention. The access device 200 may comprise a processor 202 operatively coupled to at least a network interface 210, a device communication interface 212, and a computer readable medium 204. The computer readable medium 204 comprises a recipient public key 206 and an authorization processing module 208.

The authorization processing module 208 may comprise code, which when executed by the processor 202, may cause the access device 200 to generate authorization request messages, transmit authorization request messages, receive authorization response messages, and process authorization response messages.

The computer readable medium 204 may also comprise code, which when executed by the processor 202 may implement a method comprising: providing transaction data to a user device of a user, wherein the user device signs the transaction data; receiving signed transaction data and a public key of the user from the user device; and transmitting an authorization request message including the signed transaction data and the public key of the user.

The device communication interface 212 may comprise an suitable hardware that can allow the access device 200 to communicate with a user device. via long, short, or mid-range communication protocols. The device communication interface 212 may include a QR code interface, a contactless interface, a contact interface, a Bluetooth interface, etc.

The network interface 210 may allow the access device 200 to communicate with other entities external to it. Such entities may include the TVAM 108 and/or the issuer 130.

Figure 3:
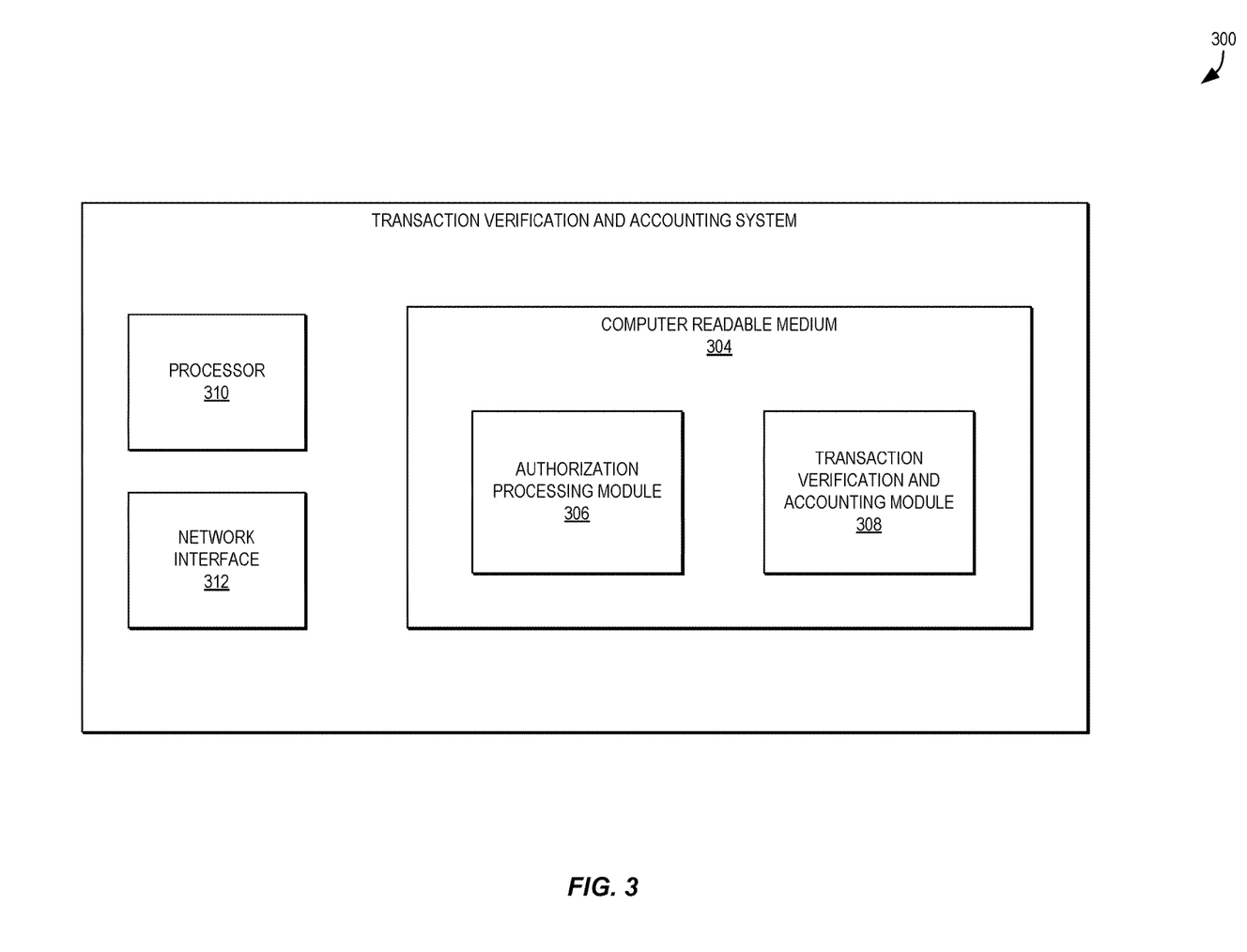
FIG. 3 shows a transaction verification and account system according to an embodiment of the invention.

FIG. 3 shows a detailed block diagram of a transaction verification and accounting system 300. The transaction verification and accounting system 300 may comprise a processor 310, a network interface 312, and a computer readable medium 304.

The computer readable medium 304 may comprise an authorization processing module 306 and a transaction verification and accounting module 308.

The authorization processing module 306 may comprise code, executable by the processor 310, to generate, modify, and transmit authorization request and response messages. It may also comprise code for performing settlement processes (e.g., between issuers and acquirers).

The transaction verification and accounting module 308 can provide functions that are similar to the TVAM 108 described above.

The network interface 312 may allow the transaction verification and accounting system 300 to communicate with other entities external to it. Such entities may include the merchant 110 or access device 200, the user device 32, and/or the issuer 130.

The transaction verification and accounting system 300 may be embodied by a server computer. The server computer may comprise a processor; and a computer readable medium, the computer readable medium comprising code, executable by the processor, for implementing a method comprising: receiving, at a server computer, an authorization request message for a transaction involving a user and a recipient, wherein the authorization request message includes a public key of the user and signed transaction data, wherein the signed transaction data was signed using a private key of the user; determining, by the server computer, that the public key of the user matches a stored public key associated with an entry of the user; determining, by the server computer using the public key, that the signed transaction data was signed using the private key of the user; and sending, by the server computer, an authorization response message indicating that the transaction is authorized.

Figure 4:
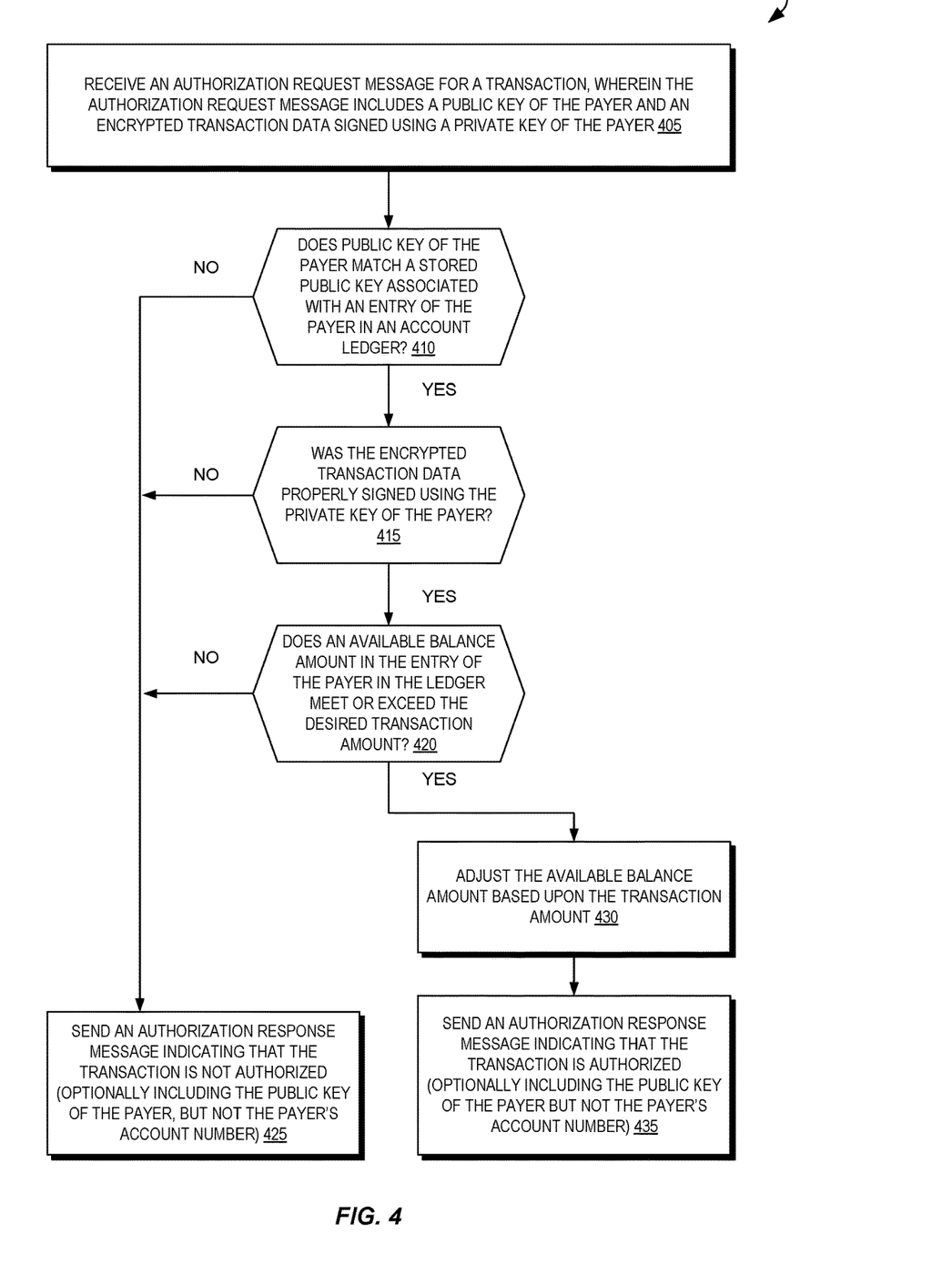
FIG. 4 shows a flowchart illustrating a method according to an embodiment of the invention.

FIG. 4 illustrates a flow in a transaction verification and account module for processing a transaction according to some embodiments.

The operations of this flow diagram will be described with reference to the exemplary embodiments of the other diagrams, such as FIG. 1. However, it should be understood that the operations of this flow diagram can be performed by other embodiments than those discussed with reference to these other diagrams, and the embodiments discussed with reference these other diagrams can perform operations different than those discussed with reference to this flow diagram.

In some embodiments, flow 400 can be performed by the TVAM 108 of FIG. 1. The details in the flow 400 may be combined with any of the prior descriptions.

The flow 400 includes, at block 405, receiving an authorization request message for a transaction. (e.g., from an access device). The authorization request message includes a public key of the payer and transaction data signed using a private key of the payer. The transaction data may be signed by a payment device of a payer, and have been provided as plaintext transaction data by a device of a merchant. The transaction data may include one or more of a transaction amount, a public key of a merchant or recipient, a date, a time, a merchant or recipient identifier/name/address, etc. The transaction data could also include user device information such as the public key on the user device, a device identifier such as a phone number, SIM card number, IMEI number, etc. In some embodiments, the authorization request message was generated and transmitted by the merchant/recipient, but in some embodiments the authorization request message was generated and transmitted by a device of the payer.

The flow 400 also includes, at decision block 410, determining whether the received public key of the payer matches any stored public key associated with an entry of the payer in an account ledger. This determining step may include performing a table-lookup (or other lookup algorithm) for determining whether an entry in a ledger exists that is associated with the public key. If no associated entry/account is found that is associated with the public key, the flow 400 continues to block 425, where the flow 400 includes sending an authorization response message indicating that the transaction is not authorized. The authorization response message, in some embodiments, includes the public key of the payer (or a payer or transaction identifier) and may or may not include the payer's account number.

However, if an associated entry/account is found at block 410, the flow 400 continues with decision block 415, where it is determined whether the encrypted transaction data was properly signed using the private key of the payer. In some embodiments, block 415 includes using the received (or looked-up) public key to verify the signed transaction data, and determining whether the transaction data is coherent and is "correct" (e.g., passes an validity test, such as it being in a designated format, includes proper data, is verified for data integrity such as by satisfying a MAC/HMAC, etc.). If not, the flow 400 continues to block 425, where a negative authorization response can be sent.

Otherwise, the flow 400 continues with decision block 415, where it is determined whether an available balance amount in the identified entry of the payer in the ledger meets or exceeds the desired transaction amount. For example, if a transaction amount specified in the received transaction data indicates that the transaction is for $100, block 415 can include looking up (or calculating) an available balance amount and determining whether it is $100 or more. If not enough available balance exists, the flow 400 continues to block 425, where a negative authorization response can be sent.

Otherwise, in some embodiments, the flow 400 continues with block 430, where the available balance is adjusted based upon the transaction amount (e.g., the transaction amount is deducted/subtracted from the available balance), and at block 435, an authorization response message is sent indicating that the transaction is authorized. The authorization response message may include the public key of the payer (or another identifier of the payer or a transaction identifier) and may or may not include the payer's account number. In some embodiments, the authorization response message is sent to a device of the merchant/recipient, and in some embodiments the authorization response message is sent to a device (e.g., the user device) of the user 30.

It is also noted that the authorization response message may be characterized as a "confirmation message" in those instances where a ledger such as a blockchain ledger at the TVAM is modified to incorporate the current transaction.

Embodiments of the invention provide for a number of advantages. As noted above, since a public key is transmitted in an authorization request and response message instead of a real account number, the real account number is protected from unauthorized persons who might otherwise steal the real account number. Also, since a central, secure TVAM can manage the private ledger, computationally intensive processes such as Bitcoin mining are not needed. Further, since the TVAM manages the ledger and the public and private key pairs, if the user devices that are used happen to break or if the private keys on them are unretrievable, then the users of those devices will not lose their money since replacement keys can be provided to them by the TVAM.

Further, because transaction data is signed in embodiments of the invention, a fraudster attempting to conduct a fraudulent transaction must be in possession of the user's user device. In addition, since the transaction data is signed, and because KYC (know your customer) is performed as part of issuing user devices, anonymity can be avoided.

Embodiments of the invention may utilize a computer system that may be used to implement any of the entities or components described above. The subsystems in the computer system may be interconnected via one or more system buses. Additional subsystems include a printer, keyboard, fixed disk, and monitor, which is coupled to display adapter. Peripherals and input/output (I/O) devices, which couple to I/O controller, can be connected to the computer system by any number of means known in the art, such as a serial port or Universal Serial Bus (USB) port. For example, serial port or external interface can be used to connect the computer apparatus to a network (e.g., wide area network, local area network, etc.) such as the Internet, a mouse input device, touchscreen, or a scanner. The interconnection via system bus allows the one or more processors to communicate with each subsystem and to control the execution of instructions from system memory or the fixed disk, as well as the exchange of data between subsystems. The system memory and/or the fixed disk may embody a non-transitory computer-readable storage medium. The non-transitory computer-readable storage medium may store instructions that, when executed by the one or more processors, cause the computer system to implement the methods and flows described herein.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of data such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired data and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C, C++, Python, JavaScript, Go, or Perl using, for example, conventional, functional, and/or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:

storing, at a server computer, a private ledger, wherein the private ledger stores a public key of a user that is associated with an entry in the private ledger, and wherein the private ledger comprises a series of blocks of transactions;

maintaining, by the server computer, the private ledger, wherein each block in the series of blocks of transactions includes a hash output as a reference to a prior transaction block in the series of blocks of transactions;

receiving, at the server computer, an authorization request message for a transaction involving the user and a recipient, wherein the authorization request message includes the public key of the user and signed transaction data, wherein the signed transaction data was signed using a private key of the user, wherein the authorization request message does not include sensitive information of the user, wherein receiving the authorization request message comprises receiving the authorization request message from an access device at the recipient;

accessing, by the server computer, the private ledger based on the received public key of the user in order to determine whether the transaction in the authorization request message is authorized;

determining, by the server computer, that the public key of the user matches the stored public key associated with the entry in the private ledger associated with the public key of the user, wherein the private ledger comprises a plurality of public keys and an account balance associated with each of the plurality of public keys;

determining, by the server computer using the public key, that the signed transaction data was signed using the private key of the user, wherein the access device sends at least some of the transaction data to a user device, and the user device signs the transaction with the private key of the user;

determining, by the server computer, based on the private ledger, that a current balance is sufficient for authorizing the transaction;

in response to determining that the signed transaction data was signed using the private key of the user and that the current balance is sufficient for authorizing the transaction, sending, by the server computer, an authorization response message indicating that the transaction is authorized, wherein the authorization response message sent by the server computer includes the public key of the user; and updating, by the server computer, the current balance of the private ledger.

2. The method of claim 1, wherein the determining that the signed transaction data was signed using the private key of the user comprises:

verifying, by the server computer, the signed transaction data using the public key of the user.

3. The method of claim 2, wherein the authorization request message further comprises an amount and a recipient public key.

4. The method of claim 3, wherein the private key is an elliptic curve cryptography (ECC) key.

5. The method of claim 1, wherein the authorization response message sent by the server computer does not include a real account number of the user.

6. A server computer comprising:

a processor; and a computer readable medium, the computer readable medium comprising code, executable by the processor, for implementing a method comprising:

storing, at the server computer, a private ledger, wherein the private ledger stores a public key of a user that is associated with an entry in the private ledger, and wherein the private ledger comprises a series of blocks of transactions;

maintaining, by the server computer, the private ledger, wherein each block in the series of blocks of transactions includes a hash output as a reference to a prior transaction block in the series of blocks of transactions:

receiving, at the server computer, an authorization request message for a transaction involving the user and a recipient, wherein the authorization request message includes the public key of the user and signed transaction data, wherein the signed transaction data was signed using a private key of the user, wherein the authorization request message does not include sensitive information of the user, wherein receiving the authorization request message comprises receiving the authorization request message from an access device at the recipient;

accessing, by the server computer, the private ledger based on the received public key of the user in order to determine whether the transaction in the authorization request message is authorized;

determining, by the server computer, that the public key of the user matches the stored public key associated with the entry in the private ledger associated with the public key of the user, wherein the private ledger comprises a plurality of public keys and an account balance associated with each of the plurality of public keys;

determining, by the server computer using the public key, that the signed transaction data was signed using the private key of the user, wherein the access device sends at least some of the transaction data to a user device, and the user device signs the transaction with the private key of the user;

determining, by the server computer, based on the private ledger, that a current balance is sufficient for authorizing the transaction;

in response to determining that the signed transaction data was signed using the private key of the user and that the current balance is sufficient for authorizing the transaction, sending, by the server computer, an authorization response message indicating that the transaction is authorized, wherein the authorization response message sent by the server computer includes the public key of the user; and updating, by the server computer, the current balance of the private ledger.

7. The server computer of claim 6, wherein the determining that the signed transaction data was signed using the private key of the user comprises:

verifying, by the server computer, the signed transaction data using the public key of the user.

8. The server computer of claim 7, wherein the authorization request message further comprises an amount and a recipient public key.

9. The method according to claim 1, wherein the private ledger is a privately managed ledger.

10. The method according to claim 1, wherein the private ledger is updated after sending the authorization response message indicating that the transaction is authorized.

11. The method according to claim 1, wherein the private ledger is associated with a plurality of different public keys.

12. The server computer according to claim 6, wherein the private key is an elliptic curve cryptography (ECC) key.

13. The server computer according to claim 6, wherein the authorization response message sent by the server computer does not include a real account number of the user.

14. The server computer according to claim 6, wherein the private ledger is a privately managed ledger.

15. The server computer according to claim 6, wherein the private ledger is associated with a plurality of different public.

* * * * *